US010710763B2

(12) United States Patent
Potempa et al.

(10) Patent No.: US 10,710,763 B2
(45) Date of Patent: Jul. 14, 2020

(54) LABELING MACHINE FOR LABELING CONTAINERS

(71) Applicant: KRONES AG, Neutraubling (DE)

(72) Inventors: Oliver Potempa, Donaustauf (DE); Andreas Kraus, Lappersdorf (DE); Stefan Scherl, Bernardswald (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/054,798

(22) Filed: Aug. 3, 2018

(65) Prior Publication Data

US 2019/0071206 A1 Mar. 7, 2019

(30) Foreign Application Priority Data

Sep. 5, 2017 (DE) .................... 20 2017 105 331 U

(51) Int. Cl.
*B65C 9/40* (2006.01)
*F16P 3/08* (2006.01)
*B65C 9/00* (2006.01)
*F16P 1/02* (2006.01)
*B65C 3/12* (2006.01)
*B65C 9/04* (2006.01)
*B65C 3/16* (2006.01)

(52) U.S. Cl.
CPC .................. *B65C 9/40* (2013.01); *B65C 3/12* (2013.01); *B65C 9/00* (2013.01); *B65C 9/04* (2013.01); *F16P 1/02* (2013.01); *F16P 3/08* (2013.01); *B65C 3/163* (2013.01)

(58) Field of Classification Search
CPC .. B65C 3/12; B65C 3/163; B65C 9/00; B65C 9/04; B65C 9/40; F16P 1/02; F16P 3/08
See application file for complete search history.

(56) References Cited

U.S. PATENT DOCUMENTS

| 6,736,433 | B2 | 5/2004 | Schwesig |
| 8,646,588 | B2* | 2/2014 | Krieger .................... E05C 3/14 |
| | | | 192/135 |
| 9,598,198 | B2* | 3/2017 | Gertlowski ............... B65C 9/40 |
| 2004/0245855 | A1* | 12/2004 | Bachle ................. H01H 27/002 |
| | | | 307/116 |

FOREIGN PATENT DOCUMENTS

| DE | 9300424 U1 | 3/1993 |
| DE | 10141835 C2 | 9/2003 |
| DE | 202005005485 U1 | 7/2005 |
| DE | 102013001546 A1 | 7/2014 |
| EP | 0940343 B1 | 1/2006 |

* cited by examiner

*Primary Examiner* — Sonya M Sengupta
(74) *Attorney, Agent, or Firm* — McCoy Russell LLP

(57) ABSTRACT

Examples are disclosed for a labeling machine for labeling containers, such as bottles in the beverage-processing industry. In one example, a labeling machine includes at least one machine unit which in operation can treat containers (e.g., label the containers), and a movable protective element which separates at least part of the machine unit from an associated environment. The protective element comprises a handle for moving the protective element, and the handle comprises a pushbutton for locking and/or unlocking. The pushbutton, when actuated, selectively releases and/or blocks the movement of the protective element.

17 Claims, 2 Drawing Sheets

LABELING MACHINE FOR LABELING CONTAINERS

CROSS REFERENCE TO RELATED APPLICATION

This application claims priority to German Utility Model Application No. 20 2017 105 331.8 entitled "LABELING MACHINE FOR LABELING CONTAINERS," filed on Sep. 5, 2017, the entire contents of which is hereby incorporated by reference in its entirety for all purposes.

TECHNICAL FIELD

This present disclosure relates to a labeling machine for labeling containers, such as bottles in the beverage-processing industry.

BACKGROUND AND SUMMARY

Container treatment machines may include labeling machines for applying labels to containers. An example machine is shown in DE 20 2005 005 485 U1, which discloses a machine including a protection door handle with a handle part. Furthermore, a functional element is provided in the example machine, which can be connected to the handle part as an additional component.

In principle, switches may be provided for protective elements of machine units with which the protective element can be released. These switches are usually mounted on a machine frame or elsewhere to ensure that an operator operating the switches cannot grip into moving parts of the machine at the same time.

However, the above approach makes the switches difficult to access. If it is also necessary for an operator to change location after renewed closing of a protective element in order to lock the protective element.

In light of example machines using the above-described approaches, the technical object to be solved is therefore to indicate a container treatment machine for the treatment of containers, in which the device for locking and unlocking a protective element can be reached in an ergonomically favorable manner.

According to the present disclosure, the above-described object is solved at least by a container treatment (e.g., labeling) machine for labeling containers, such as bottles in the beverage-processing industry, having at least one machine unit which in operation can treat containers (e.g., label the containers), and a movable protective element which separates at least part of the at least one machine unit from an environment, the protective element comprising a handle for moving the protective element. The handle of the machine may comprise a pushbutton for locking and/or unlocking (e.g., locking and/or unlocking the machine), which when actuated can selectively release and/or block the movement of the protective element (e.g., depending on the actuation of the pushbutton, as described in examples below). Advantageous further developments of the present disclosure are described below.

For the purposes of the present disclosure, a machine unit may refer to any component of the container treatment machine. In a labeling machine, example machine units may include rotating elements such as gripper cylinders or a machine carousel. In other examples, machine units may additionally or alternatively include linearly working or moving elements. With other container treatment machines, rotating elements such as a carousel on which the containers are transported and treated can also be seen as a machine unit.

A container treatment machine may include inter alia a stretch blow-molding machine for the production or inflation of PET bottles, a filling machine for filling containers, a direct printing machine for printing containers, a coating machine for coating containers, a cleaning or sterilization machine for cleaning or sterilization of containers, inspection machines for inspecting containers, a packaging machine for packaging containers such as outer packaging (film, cardboard), a conveyor for transporting containers (e.g., switches, dividers, transport starwheels, and/or buffers), palletizing machines for palletizing containers, depalletizing machines for depalletizing containers, closing machines for closing containers and the like. Accordingly, treatment can be understood as manufacturing, inflation, printing, coating, cleaning, sterilization, etc. In the following, specific reference is made to a labeling machine, but the features can also be transferred to the other machines mentioned in the present disclosure.

The proposed container treatment machines do not represent an exhaustive list of possible machines. However, the present disclosure is advantageous in combination with these container treatment machines, as there is usually a considerable risk of injury for an operator due to many moving parts and/or high temperatures/hot components. In combination with these specific machines, the present disclosure can therefore advantageously contribute to the protection of the operator and at the same time the accessibility of the machine components.

The fact that the protective element separates a part of the machine unit from the environment has an effect that manual intervention in the machine unit or the part of the machine unit is made more difficult or impossible from outside the protective element. For example, the protective element can be conceived as a box or at least a "fence" separating a space or area inside the protective element (e.g., a volume enclosed by the protection element) from the environment, so that an operator standing in the environment cannot grip into the inner area when the protective element is closed.

The provision of the pushbutton for locking and/or unlocking on the handle ensures that an operator opening or closing the protective element cannot grip into the machine unit. At the same time, the handle is easier for the operator to reach compared to other arrangements, and a delay in locking the protective element can be avoided so that subsequent operators are also prevented from accessing the machine unit during operation.

In one embodiment, the pushbutton is arranged on a side of the handle that faces away from the protective element. The pushbutton is thus more easily accessible to the operator and inadvertent non-actuation can be avoided.

It may also be provided that the pushbutton is arranged so that during operation of the handle it can be pressed to move the protective element. This embodiment also has the advantage of preventing the pushbutton from being forgotten or not being operated for other reasons.

It may also be provided that the pushbutton comprises a button which when actuated once can release the movement of the protective element and which when actuated a second time can block the movement of the protective element. The operation of the pushbutton in this embodiment is configured to promote user friendliness and can be learned by the operator with little practice.

In an alternative embodiment, it is provided that the pushbutton is configured as a dead man's device which only releases the movement of the protective element during actuation of the pushbutton and blocks the movement of the protective element if the pushbutton is not actuated. This prevents the protective element from being inadvertently not locked after it has been closed, in consideration to subsequent operators.

In one embodiment it is provided that the pushbutton is configured as an analog pushbutton or as an electronic pushbutton or switch. Here, an analog pushbutton is to be understood as such a pushbutton whose actuation by mechanical interaction with at least one other element (for example a closing element which can block the movement of the protective element) causes the movement of the protective element to be released or blocked. An electronic pushbutton or switch, on the other hand, is a switch which, at least in interaction with an electronic control unit (e.g., a computer), controls parts of the protective element and/or the labeling machine and releases or unlocks their movement. A mechanical interaction between the pushbutton or switch and these elements may not be included in electronic pushbuttons or switches.

Furthermore, it may be provided that a light element, for example one or more Light-Emitting Diodes (LEDs), is assigned to the pushbutton, which can output an optical signal if an attempt is made to move the protective element without actuation of the pushbutton. An operator attempting to move the protective element without actuating the pushbutton may not succeed. In order to shorten the troubleshooting process, the optical signal can advantageously inform the operator that the pushbutton is to be actuated to promote movement of the protective element.

Furthermore, it can be provided that the protective element is configured as a protective door with one or more door leaves or as a lift protection segment. The lift protection segment is such a protective element whose movement is substantially or completely in a vertical direction. This also includes a tilting movement around a horizontal tilting axis, during which such a protective element is moved at least partially in a vertical direction. These embodiments can be used advantageously depending on the space available for the labeling machine.

Furthermore, it can be provided that the pushbutton comprises a second button which when actuated can release the operation of the labeling machine. While a first button according to one of the above embodiments, for instance, may control the blocking and release of the movement in a suitable manner, the second button may be used as an additional measure to enable the putting into operation of the machine only after checking whether persons are in the area of the protective element.

In a further development of this example, the pushbutton is configured in such a way that the second button is only able to be actuated in the closed state of the protective element to enable operation of the labeling machine. In this way, it can be prevented that the operation is inadvertently enabled while the protective element is still open.

DETAILED DESCRIPTION

Figure 1:
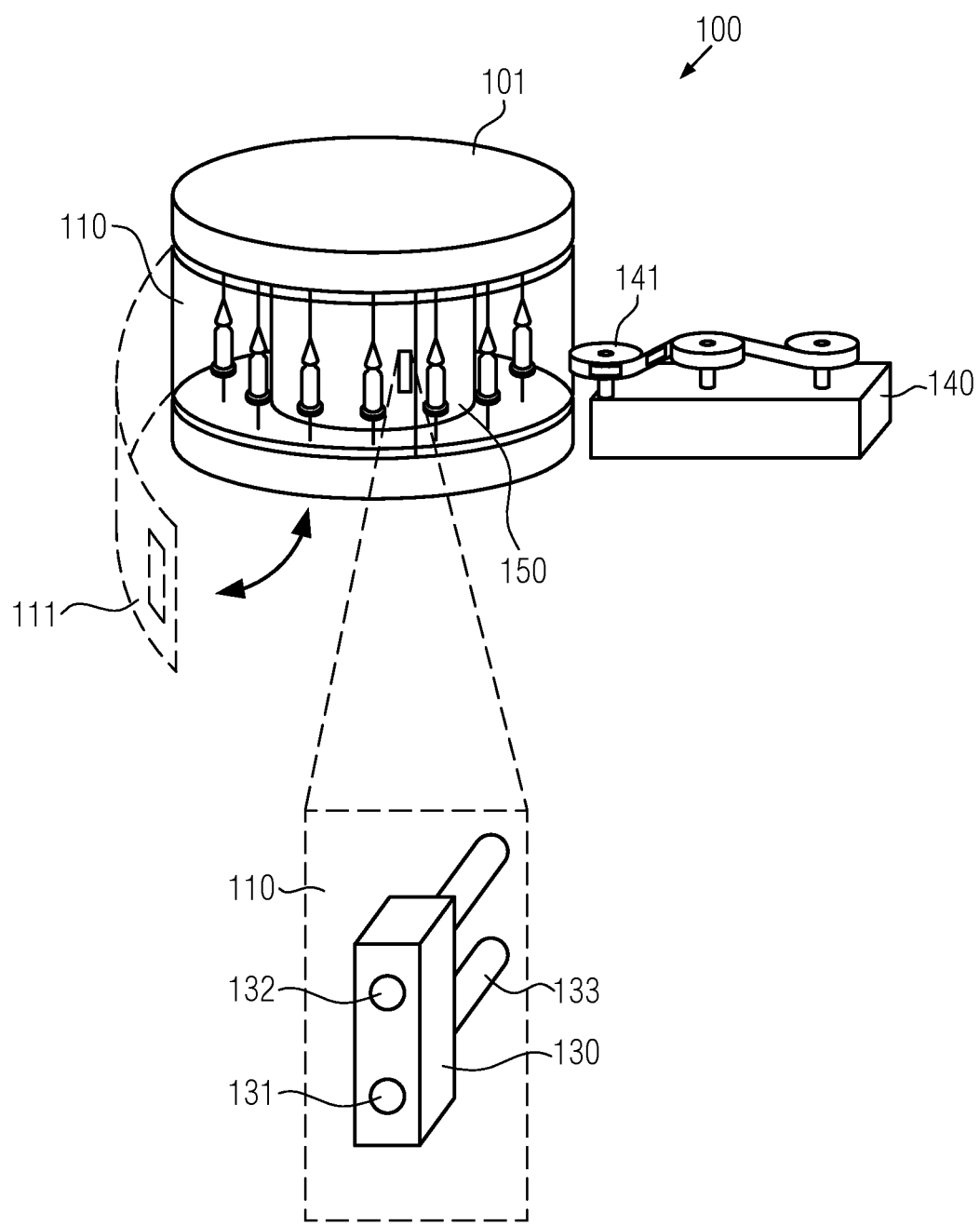
FIG. 1 schematically shows a labeling machine with a protective element according to an embodiment.

FIG. 1 shows a labeling machine 100 according to an example of the present disclosure. In the example shown in FIG. 1, the labeling machine comprises a carousel 101 at the periphery of which several container holders 150 are provided in which containers can be clamped. As the carousel 101 rotates, the containers gradually reach the labeling unit 140, where a label is applied to the containers at least with the aid of cylinder 141.

The labels may be applied, for example, with the aid of self-adhesive labels (e.g., from continuous rolls or already cut into pieces in magazines). Alternatively, cold-glue or hot-melt labels can also be used for this purpose, which are first cut to size if necessary and then provided with glue before the labels are applied to the container.

The example of the labeling machine with a carousel is not imperative. An example can also be provided in which the labeling machine is configured as a linear machine. Furthermore, not only one labeling unit 140 must be provided at the periphery or along the labeling machine, but several labeling units may also be provided, which may also apply different labels to the containers in some examples.

Furthermore, the labeling machine, in the example shown here in particular the carousel, comprises a protective element 110. In the example shown here, this protective element 110 is configured as a door, whereby the door can be configured in particular as a door leaf which can be pivoted into position 111.

The door leaf comprises a handle 130, which is intended for moving the door leaf or, more generally, the protective element. For this purpose, the handle 130 can be connected to the protective element via connecting elements 133 (even only one connecting element or more than two connecting elements are conceivable here), so that an operator who actuates or pulls or presses the handle in an appropriate manner can move the protective element. In the embodiment shown here, pulling the handle 130 can therefore open the door, whereas pressing the handle when the door is open will close it.

According to the present disclosure, the handle 130 comprises at least one pushbutton (also called switch) 131 or 132 with which upon actuation the movement of the protective element can be released and/or blocked. In the embodiment shown here, two buttons 131 and 132 are provided, which together form the pushbutton according to the present disclosure. Upon actuation, one of these buttons may allow the opening of the protective element in such a way that a movement from the closed state is released. In this embodiment, the other button may be used to close the open door or to block the movement of the protective element when actuated.

Alternatively or additionally, one of the buttons, e.g., button 131, may be used to block and release the movement of the protective element and the second button (e.g., button 132) can be used for acknowledgement. In such an example, the operator can open and close the protective element by actuating the button 131. While the protective element is open, the machine may be configured to not enable an operator to operate the machine at all. After the operator has closed the protective element (for example by actuating button 131), it can be provided that the operation of the machine is nevertheless not immediately released. Instead, acknowledgement or confirmation by the operator by pressing the second button 132 can be provided as a necessary signal for restarting the machine, so that the operator checks via button 132 before acknowledgment whether any other persons are in the area of the labeling machine or even inside the protective element and only then enables operation of the labeling machine by actuating button 132.

Such a button for acknowledging or confirming that the labeling machine can be put back into operation can also be provided as a "third" button or switch in addition to the examples described here, whereby a first (and second) button can be used to release and block the movement of the protective element (e.g., respectively).

While the protective element in the example shown in FIG. 1 is configured as a door leaf or general door, it may also be provided that the protective element is configured in the sense of a hood and movement of the protective element takes place at least in part in a vertical direction. For example, a protective element 110 may be arranged on the periphery of the carousel 101, and the protective element may be moveable upwards or downwards, substantially parallel to the rotation axis of the carousel. Such examples may be used if the space available in the plane is too small to allow doors to be opened.

In such a case, the arrangement of the handle shown in FIG. 1 may be modified, as the illustrated arrangement may not be as ergonomic as other arrangements to the operator in such a way that the lift protection segment provided can be lifted. In the case of providing the protective element 110 as a lift protection segment, the handle may be arranged transversely, e.g., tilted by 90° with respect to the embodiment shown in FIG. 1.

The configuration of the handle 130 as a cuboid, as schematically shown in FIG. 1, is also not to be understood as imperative or restrictive. All examples can be used here, also ergonomically more suitable ones for associated uses.

In order to generally prevent slipping from the handle during the movement of the protective element, the handle may include and/or have applied thereto an anti-slip coating. In some examples, the pushbutton may also include and/or be provided with such a coating.

Figure 2A:
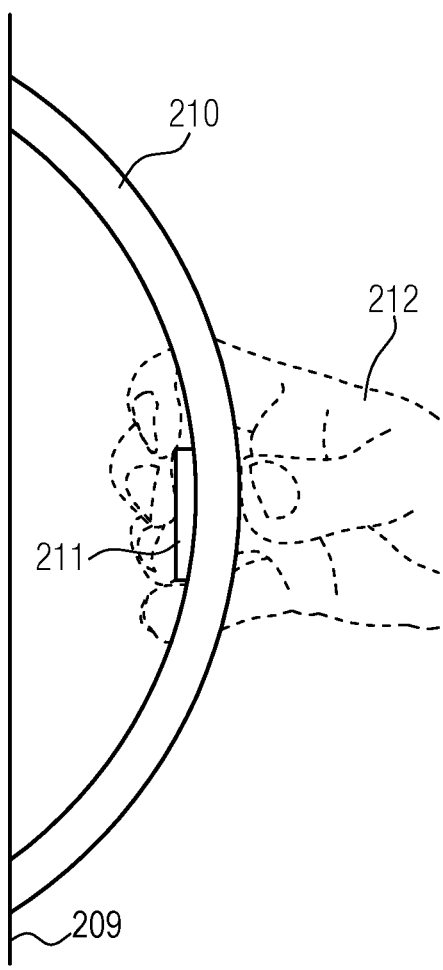
FIGS. 2A-2C show embodiments of different handles with pushbuttons.
Figure 2B:
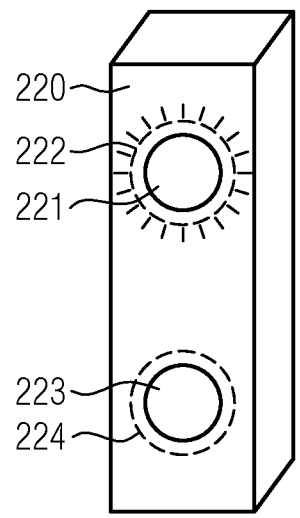
Figure 2C:
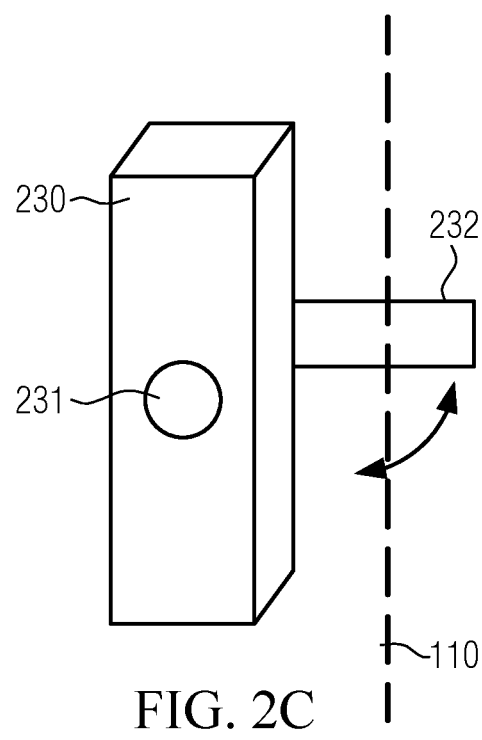

FIGS. 2A to 2C show different examples of the handle and the pushbutton.

FIG. 2A shows a handle 210 on a protective element 209, which may be an example of protective element 110 of FIG. 1. On a side facing the protective element 209 (in contrast to the embodiment shown in FIG. 1), the handle 210 has a single button as pushbutton 211. This pushbutton may be configured as a dead man's device, so that the movement of the protective element 209, to which the pushbutton is attached, is only possible if pushbutton 211 is also actuated. When the pushbutton is released, the movement of the protective element may be completely blocked. The arrangement of the pushbutton on the back or the side of the handle facing the protective element 209 may protect the pushbutton from unwanted environmental influences. Furthermore, unwanted actuation by an operator pushing against the handle may be avoided, whereas at the same time a good accessibility of the pushbutton is achieved when gripping around the handle in some manner (shown here by hand 212).

In the embodiment shown in FIG. 2B, handle 220, as a pushbutton as shown in FIG. 1, comprises two buttons 221 and 223. One of these buttons may be used to release the movement of the protective element not shown here (e.g., where the handle 220 is integrated with, mounted on, mechanically or electrically connected with, and/or otherwise associated with a protective element of a machine), while the other is configured to block the movement of the protective element. Alternatively, it may also be provided that one of the buttons (e.g., button 221) allows the opening of the protective element when actuated, whereas the other button (e.g., button 223 in this case) allows the labeling machine to be closed again and then put back into operation when actuated.

To make it easier for the operator to select the right buttons, a light element, for example an LED, may be assigned to each button. In the embodiment shown in FIG. 2B, this is achieved by the ring light element 222 or 224 around the button 221 or 223, respectively. This ring of light or, more generally, the light element, may light up if the subsequent movement of a protective element requires actuation of the associated button. If, for example, the protective element is in the closed state, opening is the only possible movement for the protective element. If button 221 is intended for opening the protective element or for releasing the movement required for this, the light element (e.g., ring) 222 may light up (e.g., permanently) in the closed state of the protective element. Furthermore or alternatively, it may be provided that the respective light element is only activated and flashes, for example, if a movement is attempted without actuating any buttons 221 and 223 or the wrong button (e.g., a button that is not actuatable to enable the attempted movement) is actuated. Furthermore, the light elements may include or present different colors or markings under different conditions in some examples. For example, if the wrong button is actuated (e.g., input is made to a button that is actuatable to release the protective element when the protective element is already released, or input is made to a button that is actuatable to block movement of the protective element when movement of the protective element is already blocked), the corresponding light element may flash red, whereas the light element for the correct button lights green.

Other colors or signal patterns are also conceivable here.

The examples of pushbuttons shown in FIGS. 2A and 2B may be provided in analog and/or electronic form. To control the release or blocking of the movement of the protective element 110, the electronic pushbuttons can be connected to a control unit, for instance the central control unit of the labeling machine, in particular a computer, which in turn controls certain, electrically controllable closing mechanisms of the labeling machine and controls the mechanisms depending on the actuation of the pushbutton.

FIG. 2C shows an embodiment of handle 230 with an analog pushbutton 231, which is shown here as a single button. This button may, for example, be configured as a dead man's device in accordance with FIG. 2A and only allow the protective element 110 to move during actuation of the button.

The analog pushbutton 231 is mechanically connected to a closing element 232 in such a way that actuation of pushbutton 231 is translated into a movement of the closing element 232, which releases the movement of an associated protective element at least when pushbutton 231 is actuated. Such an analog version of the pushbutton can be advantageous, as this ensures safe opening and closing or general movement of the protective element even when the central power supply to the labeling machine is switched off.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the pushbuttons 131, 132, 211, 221, 223, and 231 described with reference to FIGS. 1-2C, respectively. The described methods and associated actions may

The invention claimed is:

1. A labeling machine for labeling containers, the labeling machine comprising:
   at least one machine unit which is operable to treat containers; and
   a movable protective element which separates at least part of the at least one machine unit from an environment, the protective element comprising a handle for moving the protective element, wherein the handle comprises a pushbutton for locking and/or unlocking, the pushbutton being actuatable to selectively release and/or block movement of the protective element, wherein the pushbutton comprises a first button which, when actuated, blocks operation of the labeling machine, wherein the pushbutton further comprises a second button which, when actuated, releases operation of the labeling machine, wherein the pushbutton is configured such that the second button is only actuatable when the protective element is closed to release the operation of the labeling machine, and wherein the second button, when actuated as a release input, releases operation of the labeling machine upon receipt of a confirmation input.

2. The labeling machine according to claim 1, wherein the pushbutton is arranged on a side of the handle facing away from the protective element.

3. The labeling machine according to claim 1, wherein the pushbutton is arranged on a side or back of the handle facing the protective element.

4. The labeling machine according to claim 1, wherein the pushbutton is arranged to be able to be pressed when the handle is operated to move the protective element.

5. The labeling machine according to claim 1, wherein the pushbutton comprises a button which, when actuated once, releases the movement of the protective element and which, when actuated a second time, blocks the movement of the protective element.

6. The labeling machine according to claim 1, wherein the pushbutton is configured as a dead man's device, wherein the pushbutton releases the movement of the protective element only during actuation of the pushbutton and the pushbutton blocks the movement of the protective element while the pushbutton is not actuated.

7. The labeling machine according to claim 1, wherein the pushbutton is configured as an analog pushbutton.

8. The labeling machine according to claim 1, wherein the pushbutton is configured as an electronic pushbutton.

9. The labeling machine according to claim 1, wherein the pushbutton has assigned thereto a light element, and wherein the light element is operable to output an optical signal responsive to an attempt being made to move the protective element without actuation of the pushbutton.

10. The labeling machine according to claim 9, wherein the light element comprises one or more Light-Emitting Diodes (LEDs).

11. The labeling machine according to claim 1, wherein the protective element is configured as a protective door with one or more door leaves or as a lift protection segment.

12. The labeling machine of claim 1, wherein the confirmation input comprises a second actuation of the second button after the release input.

13. The labeling machine of claim 1, further comprising a third button, wherein the confirmation input comprises actuation of the third button after the release input.

14. The labeling machine of claim 1, further comprising a first light element assigned to the first button and a second light element assigned to the second button, wherein the first light element is activated responsive to actuation of the second button while the operation of the labeling machine is already released, and wherein the second light element is activated responsive to actuation of the first button while the operation of the labeling machine is already blocked.

15. The labeling machine according to claim 14, wherein the first light element includes a ring of light elements around the first button and wherein the second light element includes a ring of light elements around the second button.

16. The labeling machine according to claim 1, wherein the at least one machine unit is operable to label the containers.

17. A machine, comprising:
a machine unit;
a control unit controlling one or more closing mechanisms of the machine; and
a movable protective element which separates at least part of the machine unit from an environment, the protective element comprising a handle for moving the protective element, the handle comprising a pushbutton connected to the control unit, wherein the pushbutton is actuatable to control the control unit to release movement of the protective element responsive to a first actuation and to block movement of the protective element responsive to a second actuation, wherein the pushbutton comprises a first button which, when actuated, blocks operation of the labeling machine, wherein the pushbutton further comprises a second button which, when actuated, releases operation of the labeling machine, wherein the pushbutton is configured such that the second button is only actuatable when the protective element is closed to release the operation of the labeling machine, and wherein the second button, when actuated as a release input, releases operation of the labeling machine upon receipt of a confirmation input.

* * * * *